United States Patent
Nousiainen et al.

(10) Patent No.: US 9,885,000 B2
(45) Date of Patent: Feb. 6, 2018

(54) RENEWABLE HYDROCARBON COMPOSITION

(71) Applicant: UPM-KYMMENE CORPORATION, Helsinki (FI)

(72) Inventors: Jaakko Nousiainen, Lappeenranta (FI); Arto Rissanen, Lappeenranta (FI); Heli Laumola, Helsinki (FI); Teemu Lindberg, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/781,989

(22) PCT Filed: Mar. 24, 2014

(86) PCT No.: PCT/EP2014/055828
§ 371 (c)(1),
(2) Date: Oct. 2, 2015

(87) PCT Pub. No.: WO2014/161736
PCT Pub. Date: Oct. 9, 2014

(65) Prior Publication Data
US 2016/0032204 A1  Feb. 4, 2016

(30) Foreign Application Priority Data

Apr. 2, 2013  (FI) ...................... 20135310

(51) Int. Cl.
*C10L 1/04* (2006.01)
*C10L 1/02* (2006.01)
(Continued)

(52) U.S. Cl.
CPC .................. *C10L 1/04* (2013.01); *C10G 3/42* (2013.01); *C10G 3/44* (2013.01); *C10G 3/46* (2013.01);
(Continued)

(58) Field of Classification Search
CPC .... C10L 1/04; C10L 1/023; C10L 1/06; C10L 1/16; C10L 1/1608; C10L 1/1616;
(Continued)

(56) References Cited

U.S. PATENT DOCUMENTS

| 5,180,868 A | 1/1993 | Baker et al. |
| 5,705,722 A | 1/1998 | Monnier et al. |

(Continued)

FOREIGN PATENT DOCUMENTS

| CN | 1376191 A | 10/2002 |
| EP | 2097496 B1 | 12/2010 |

(Continued)

OTHER PUBLICATIONS

Finnish Search Report dated Dec. 18, 2013 re: Application No. 20135309; p. 1; citing: WO 2006100584 A2, WO 2012069706 A2, WO 2013156682 A2 and EP 2097496 B1.

(Continued)

*Primary Examiner* — Cephia D Toomer
(74) *Attorney, Agent, or Firm* — Cantor Colburn LLP

(57) ABSTRACT

The present invention provides a composition comprising 8-30 mass % of $C_{4-12}$ linear alkanes, 5-50 mass % of $C_{4-12}$ branched alkanes, 25-60 mass % of $C_{5-12}$ cycloalkanes, 1-25 mass of $C_{6-12}$ aromatic hydrocarbons, no more than 1 mass % of alkenes, and no more than 0.5 mass % in total of oxygen-containing compounds; wherein the total amount of $C_{4-12}$ alkanes is 40-80 mass %, and the total amount of $C_{4-12}$ alkanes, $C_{5-12}$ cycloalkanes and $C_{6-12}$ aromatic hydrocarbons is at least 95 mass %; and wherein the amounts are based on the mass of the composition. Also provided is a method for producing the composition comprising the step of hydroprocessing a biological feedstock using a catalyst and the step of fractionating the product of the hydroprocessing step.

21 Claims, 1 Drawing Sheet

(51) Int. Cl.
  *C10L 1/06* (2006.01)
  *C11C 3/12* (2006.01)
  *C10G 3/00* (2006.01)
  *C11B 3/00* (2006.01)
  *C10G 7/00* (2006.01)
  *C10L 1/16* (2006.01)
  *C10L 1/18* (2006.01)
  *C10L 1/182* (2006.01)
  *C10L 1/185* (2006.01)

(52) U.S. Cl.
  CPC .............. *C10G 3/49* (2013.01); *C10G 3/50* (2013.01); *C10G 7/00* (2013.01); *C10L 1/023* (2013.01); *C10L 1/06* (2013.01); *C10L 1/16* (2013.01); *C10L 1/18* (2013.01); *C11B 3/00* (2013.01); *C11C 3/12* (2013.01); C10G 2300/1011 (2013.01); C10G 2300/1014 (2013.01); C10G 2300/1018 (2013.01); C10G 2400/02 (2013.01); C10L 1/1608 (2013.01); C10L 1/1616 (2013.01); C10L 1/1822 (2013.01); C10L 1/1824 (2013.01); C10L 1/1852 (2013.01); C10L 2200/0423 (2013.01); C10L 2200/0469 (2013.01); C10L 2290/543 (2013.01); Y02P 30/20 (2015.11)

(58) Field of Classification Search
  CPC ........ C10L 1/18; C10L 1/1822; C10L 1/1824; C10L 1/1852; C10L 2200/0423; C10L 2200/0469; C10L 2290/543; C10G 3/42; C10G 3/44; C10G 3/46; C10G 3/49; C10G 3/50; C10G 2300/1011; C10G 2300/1014; C10G 2300/1018; C10G 2400/02; C10G 7/00; C11C 3/12; C11B 3/00; Y02P 30/20
  See application file for complete search history.

(56) References Cited

U.S. PATENT DOCUMENTS

| | | | |
|---|---|---|---|
| 7,585,337 B1* | 9/2009 | Turocy | C10L 1/10 44/448 |
| 7,897,824 B2* | 3/2011 | Aulich | C10L 1/04 585/240 |
| 8,192,510 B2* | 6/2012 | Mattingly | C10L 1/023 44/451 |
| 8,608,812 B2 | 12/2013 | Perego et al. | |
| 8,912,374 B2 | 12/2014 | Van Heuzen et al. | |
| 9,120,982 B2 | 9/2015 | Nousiainen et al. | |
| 9,181,494 B2 | 11/2015 | Nousiainen et al. | |
| 9,382,483 B2 | 7/2016 | Knuuttila et al. | |
| 9,499,767 B2 | 11/2016 | Stigsson et al. | |
| 2009/0253947 A1 | 10/2009 | Brandvold et al. | |
| 2009/0300970 A1 | 12/2009 | Perego et al. | |
| 2010/0076236 A1 | 3/2010 | Van Heuzen et al. | |
| 2011/0015459 A1 | 1/2011 | Aalto et al. | |
| 2011/0098494 A1 | 4/2011 | Wilfried et al. | |
| 2011/0319683 A1 | 12/2011 | Abhari et al. | |
| 2012/0260565 A1 | 10/2012 | Nousiainen et al. | |
| 2012/0266838 A1 | 10/2012 | Gosselink et al. | |
| 2013/0041192 A1 | 2/2013 | Saviainen et al. | |
| 2013/0067801 A1 | 3/2013 | Nousiainen et al. | |
| 2015/0057474 A1 | 2/2015 | Nousiainen et al. | |
| 2015/0159100 A1 | 6/2015 | Shi et al. | |
| 2016/0046872 A1 | 2/2016 | Lindberg et al. | |

FOREIGN PATENT DOCUMENTS

| | | |
|---|---|---|
| FI | 20125422 | 1/2014 |
| WO | 2006100584 A2 | 9/2006 |
| WO | 2008101945 A1 | 8/2008 |
| WO | 2012069706 A2 | 5/2012 |
| WO | 201356682 A2 | 10/2013 |

OTHER PUBLICATIONS

Finnish Search Report dated Dec. 20, 2013 re: Application No. 20135310; p. 1; citing: WO 2013/56682 A2, US 201131983 A1, EP 2097496 B1.

Heather Wansbrough "Tall Oil Production and Processing"; Grant and Hockh's Chemical Dictionary (5th ed); 1987; pp. 1-11; http:/nzic.org.nz/ChemProcesses/forestry/4G.pdf.

Y. Bricker et al. "Diesel Fuel Analysis by GC-FIMS: Aromatics, n-Paraffins, and Isoparaffins", Energy & Fuels, American Chemical Society, Jan. 17, 2001, vol. 15, No. 1, pp. 23-37, XP055077679.

CN office action dated Aug. 10, 2016 re: Application No. 201480020167.2; pp. 1-15; citing: US2011319683A1, US2012260565A1, and CN1376191A.

Final EA: "Appendix 6A Composition of Crude Oil and Refined Products", Oct. 29. 2008 XP055120506; URL:http://www.epa.gov/region6/6en/xp/longhorn_nepa_documents/ppapp6a.pdf.

International Preliminary Report on Patentability dated Jul. 21, 2015 re: Application No. PCT/EP2014/055828; pp. 1-19.

International Search Report and Written Opinion dated Jun. 13, 2014 re: Application No. PCT/EP2014/055828; pp. 1-13.

Censullo et al; "Final Report to California Air Resources Board on Contract No. 98-310, Investigation of Low Reactivity Solvents"; Department of Chemistry and Biochemistry California Polytechnic State University; May 10, 2002; 1-124.

"Some Petroleum Solvents", 1. Chemical and Physical Data, IARC Monographs, vol. 47, 43-77, published 1987.

\* cited by examiner

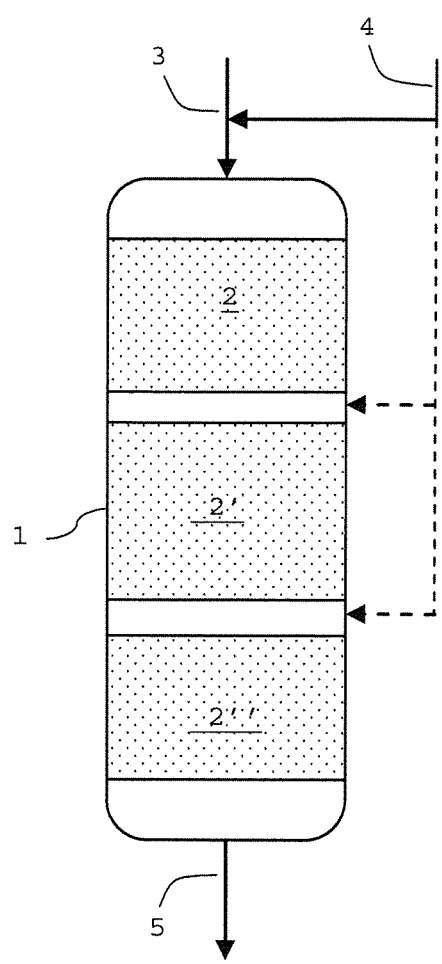

RENEWABLE HYDROCARBON COMPOSITION

TECHNICAL FIELD

The present invention relates to a hydrocarbon composition. More particularly, the present invention relates to a composition which contains a variety of hydrocarbons and is obtainable from a renewable biological feedstock. The composition can be used as a fuel component.

BACKGROUND OF THE INVENTION

Fuels are conventionally produced by refining crude oil (petroleum). This typically involves separating various fractions of crude oil by distillation. One such fraction is naphtha, which is a volatile liquid fraction distilled between the light gaseous components of crude oil and the heavier kerosene fraction. Naphtha contains a mixture of hydrocarbons (linear alkanes, branched alkanes, cycloalkanes and aromatic hydrocarbons) having a boiling point between about 30° C. and about 200° C. The density of naphtha is typically 750-785 kg/m$^3$.

Naphtha has many uses, one of which is as an automotive fuel. Naphtha is also used as a lighter fluid and as a fuel for camping stoves.

Renewable fuels derived from biological matter ("biofuels") are gaining popularity as a more environmentally friendly alternative to fossil fuels. Examples of biofuels include biodiesel, which is typically produced by transesterification of triglycerides contained in vegetable oils (e.g. soybean oil). This yields a mixture of fatty acid alkyl esters (e.g. fatty acid methyl ester (FAME)). Biodiesel can also be produced from animal fats (e.g. tallow).

An object of the present invention is to provide a renewable hydrocarbon composition which is useful as a fuel component.

SUMMARY OF THE INVENTION

A first embodiment of the present invention is a composition comprising 8-30 mass % of $C_{4-12}$ linear alkanes, 5-50 mass % of $C_{4-12}$ branched alkanes, 25-60 mass % of $C_{5-12}$ cycloalkanes, 1-25 mass of $C_{6-12}$ aromatic hydrocarbons, no more than 1 mass % of alkenes, and no more than 0.5 mass % in total of oxygen-containing compounds; wherein the total amount of $C_{4-12}$ alkanes is 40-80 mass %, and the total amount of $C_{4-12}$ alkanes, $C_{5-12}$ cycloalkanes and $C_{6-12}$ aromatic hydrocarbons is at least 95 mass %; and wherein the amounts are based on the mass of the composition.

The above composition has a high content of hydrocarbons and a low content of oxygen and oxygen-containing compounds (oxygenates). In particular, the composition contains no ester compounds or a negligible amount of ester compounds. The composition also has a good stability. The total hydrocarbon content is comparable to that of petroleum-derived fuels. This makes the composition highly suitable for use as a petrofuel replacement or a biofuel component to be blended with a petrofuel. The composition is particularly suitable for use as a petroleum naphtha substitute owing to the carbon contents and the amounts of the various hydrocarbons.

A key feature of the composition of the invention is that it can be produced from a renewable biological feedstock. More particularly, it is possible to produce the composition by subjecting a biological feedstock (e.g. crude tall oil) to hydroprocessing (i.e. treatment with hydrogen gas) using a catalyst. Hydroprocessing chemically alters compounds in the feedstock; heteroatoms (e.g. sulfur and oxygen) can be removed from feedstock compounds and unsaturated compounds can be hydrogenated.

Another embodiment of the invention is a method for producing a composition as defined above, the method comprising the step of hydroprocessing a biological feedstock using one or more catalysts and fractionating the hydroprocessed product. As mentioned above, the ability to produce the composition of the invention from a biological feedstock enables the composition to be used as a renewable fuel component.

A further embodiment of the invention is the use of a composition as defined above as a fuel or a fuel component. The composition is suitable for use as a biofuel on its own or as a renewable component of a fuel due to its high hydrocarbon content and low oxygen content.

A still further embodiment of the invention is a fuel blend comprising a composition as defined above. As already mentioned, the composition is compatible with petrofuels, particularly petroleum naphtha and petroleum gasoline. The composition can also be blended with non-hydrocarbons such as ethanol, which can be produced by a biological process. Thus, it is possible to produce a fuel containing a high proportion of renewable components.

BRIEF DESCRIPTION OF THE DRAWINGS

FIG. 1: Schematic diagram illustrating a hydroprocessing reactor suitable for use in the production method of the present invention.

DETAILED DESCRIPTION

In this application, the terms "comprising", "comprise(d)", "containing" and "contain(ed)" in the context of one or more components of the composition cover the case where the named components are the sole components of the composition as well as the case where other components are present. When the composition is defined as containing a certain amount of a compound defined in generic terms (e.g. $C_{4-12}$ linear alkanes), the definition of a subset of compounds (e.g. $C_{5-9}$ linear alkanes) or a specific compound (e.g. n-hexane) falling within the generic class means that the subset of compounds or the specific compound is present in said amount and other compounds (e.g. $C_8$ linear alkanes) within the generic class may or may not be contained in the composition.

The composition of the invention is described in detail below. Unless otherwise specified, all amounts are in mass % based on the mass of the composition.

The composition comprises 8-30 mass % of $C_{4-12}$ linear alkanes. The content of $C_{4-12}$ linear alkanes is preferably 10-20 mass %, more preferably 12-18 mass %. The linear alkanes are preferably $C_{5-10}$ linear alkanes, more preferably $C_{5-9}$ linear alkanes, i.e. the composition preferably comprises 8-30 mass % of $C_{5-10}$ linear alkanes, more preferably 8-30 mass % of $C_{5-9}$ linear alkanes.

In one embodiment, the composition contains 10-20 mass % of $C_{5-10}$ linear alkanes. In another embodiment, the composition contains 10-20 mass % of $C_{5-9}$ linear alkanes. In a further embodiment, the composition contains 12-18 mass % of $C_{5-10}$ linear alkanes. In a still further embodiment, the composition contains 12-18 mass % of $C_{5-9}$ linear alkanes.

The composition comprises 5-50 mass % of $C_{4-12}$ branched alkanes. The content of $C_{4-12}$ branched alkanes is preferably 20-40 mass %, more preferably 30-40 mass % from the viewpoint of the cold flow properties of the composition. The branched alkanes are preferably $C_{5-11}$ branched alkanes, more preferably $C_{5-10}$ branched alkanes.

In one embodiment, the composition contains 20-40 mass % of $C_{5-11}$ branched alkanes. In another embodiment, the composition contains 20-40 mass % of $C_{5-10}$ branched alkanes. In a further embodiment, the composition contains 30-40 mass % of $C_{5-11}$ branched alkanes. In a still further embodiment, the composition contains 30-40 mass % of $C_{5-10}$ branched alkanes.

The composition comprises 25-60 mass % of $C_{5-12}$ cycloalkanes. The content of $C_{5-12}$ cycloalkanes is preferably 30-50 mass %, more preferably 35-45 mass %. The cycloalkanes are preferably $C_{6-10}$ cycloalkanes, more preferably $C_{6-9}$ cycloalkanes.

In one embodiment, the composition contains 30-50 mass % of $C_{6-10}$ cycloalkanes. In another embodiment, the composition contains 30-50 mass % of $C_{6-9}$ cycloalkanes. In a further embodiment, the composition contains 35-45 mass % of $C_{6-10}$ cycloalkanes. In a still further embodiment, the composition contains 35-45 mass % of $C_{6-9}$ cycloalkanes.

The composition comprises 1-25 mass % of $C_{6-12}$ aromatic hydrocarbons. The content of $C_{6-12}$ aromatic hydrocarbons is preferably 2-15 mass %, more preferably 5-10 mass %. The aromatic hydrocarbons are preferably $C_{6-10}$ aromatic hydrocarbons, more preferably $C_{7-10}$ aromatic hydrocarbons. The carbon numbers denote the total number of carbon atoms contained in the aromatic hydrocarbons, including the carbon atoms contained in non-aromatic constituents (e.g. alkyl substituents of an aromatic ring). Examples of the aromatic hydrocarbons include ethylbenzene, xylenes, butyl benzene and ethyl butyl benzene.

In one embodiment, the composition contains 2-15 mass % of $C_{6-10}$ aromatic hydrocarbons. In another embodiment, the composition contains 2-15 mass % of $C_{7-10}$ aromatic hydrocarbons. In a further embodiment, the composition contains 5-10 mass % of $C_{6-10}$ aromatic hydrocarbons. In a still further embodiment, the composition contains 5-10 mass % of $C_{7-10}$ aromatic hydrocarbons.

The total amount of $C_{4-12}$ alkanes in the composition is 40-80 mass %, preferably 40-70 mass %, more preferably 40-60 mass % and most preferably 45-55 mass %. "Alkanes" covers both linear and branched alkanes.

The composition preferably comprises at least 80 mass % in total of $C_{4-12}$ alkanes and $C_{5-12}$ cycloalkanes, more preferably at least 85 mass %, still more preferably at least 90 mass % and most preferably 90-95 mass % in total of $C_{4-12}$ alkanes and $C_{5-12}$ cycloalkanes.

The composition contains $C_{4-12}$ alkanes, $C_{5-12}$ cycloalkanes and $C_{6-12}$ aromatic hydrocarbons in a total amount of at least 95 mass. Accordingly, the composition contains no more than 5 mass % of other hydrocarbons. In particular, the composition contains no more than 1 mass % of alkenes. Such a low alkene content can be achieved using the hydroprocessing method of the invention. A low alkene content is beneficial in terms of the oxidation stability of the composition.

The composition contains no more than 0.5 mass % in total of oxygen-containing compounds (oxygenates), thereby conforming with the EN 228 Standard. This ensures that the composition is stable during storage and is compatible with petroleum-derived fuels, particularly petroleum naphtha. The total amount of oxygenates (e.g. esters) contained in the composition is preferably no more than 0.2 mass %, more preferably no more than 0.1 mass %. In elemental terms, it is preferred that the composition contains no more than 0.1 mass % of oxygen, more preferably no more than 0.05 mass % of oxygen and most preferably no more than 0.02 mass % of oxygen.

The density of the composition is typically 720-775 kg/m³, as measured at 15° C. by the method of EN ISO 12185. This is comparable to the density of petroleum naphtha.

The composition has unique distillation properties. In one embodiment, the composition begins to distil at a temperature of about 30° C. and distillation is complete at a temperature of no more than 210° C., preferably no more than 200° C., as measured by the method of EN ISO 3405. It is preferable that at least 95 vol. % of the composition is distilled at temperatures up to 180° C., more preferably up to 170° C.

As a further property, the mean-average molecular weight of the composition can be as low as 100 g/mol. In one embodiment, the average molecular weight is 90-110 g/mol. In another embodiment, the average molecular weight is 98-108 g/mol.

The method for producing the composition of the invention is explained in detail below.

The method comprises the step of hydroprocessing a biological feedstock using one or more catalysts. Hydroprocessing chemically alters compounds contained in the feedstock. Typical reactions include hydrogenation of double bonds, deoxygenation (e.g. by decarboxylation), desulfurisation, denitrification, isomerisation, ring-opening, aromatisation, dearomatisation and cracking. For instance, any terpenes contained in the feedstock can be converted to non-terpenic acyclic and/or cyclic hydrocarbons (e.g. 1-isopropyl-4-methylcyclohexane and 2,6-dimethyloctane) by hydrogenation of olefinic bonds and ring-opening. Aromatic hydrocarbons (e.g. 1,1,2,5-tetramethylbenzene, 1,1,2,3-tetramethylbenzene and 1-isopropyl-4-methylbenzene) can be produced by dehydrogenation of cyclohexane-containing compounds derived from terpenes. Bound contaminants such as sulfur can be converted to gaseous compounds (e.g. hydrogen sulfide), which can be removed in a subsequent step.

The biological feedstock can be selected from a range of feedstocks. Particular examples are the following:

i) plant (vegetable) and animal (including fish) fats, oils and waxes;
ii) free fatty acids obtained by hydrolysis or pyrolysis of plant and animal fats, oils and waxes;
iii) fatty acid esters obtained by transesterification of plant and animal fats, oils and waxes;
iv) metal salts of fatty acids obtained by saponification of plant and animal fats, oils and waxes;
v) anhydrides of fatty acids obtained from plant and animal fats, oils and waxes;
vi) esters obtained by esterification of free fatty acids of plant and animal origin with alcohols;
vii) fatty alcohols or aldehydes obtained as reduction products of fatty acids from plant and animal fats, oils and waxes;
viii) recycled food-grade fats and oils;
ix) fats, oils and waxes obtained by genetic engineering;
x) dicarboxylic acids, polyols (including diols), hydroxyketones, hydroxyaldehydes, hydroxycarboxylic acids and corresponding di- and multi-functional sulfur- and nitrogen-containing compounds;
xi) compounds derived from algae; and
xii) mixtures of these.

In one embodiment, the feedstock comprises or consists of one or more of tall oil, tall oil components (e.g. tall oil fatty acids) and tall oil derivatives (e.g. tall oil resin acids and tall oil pitch). Tall oil is obtained from kraft pulping of wood, especially coniferous wood. In general, tall oil contains saturated and unsaturated oxygen-containing organic compounds such as resin acids (mainly abietic acid and its isomers), fatty acids (mainly linoleic acid, oleic acid and linolenic acid), unsaponifiables, fatty alcohols, sterols and other alkyl hydrocarbon derivatives, as well as minor amounts of inorganic impurities (e.g. alkaline metal compounds, sulfur, silicon, phosphorus, calcium and iron compounds). Tall oil usually does not contain a significant amount of triglycerides since these compounds are decomposed during the pulping process. "Tall oil" covers soap oil as well as crude tall oil.

In a preferred embodiment, the feedstock comprises at least 15 mass %, more suitably at least 25 mass %, at least 35 mass % or at least 45 mass %, of $C_{12-18}$ fatty acids (e.g. linoleic acid, oleic acid and linolenic acid); at least 5 mass %, more suitably at least 15 mass %, at least 20 mass % or at least 25 mass %, of resin acids (e.g. abietic acid, pimaric acid and isomers thereof); and at least 10 mass, more suitably at least 15 mass % or at least 20 mass %, of neutral products (e.g. sterols) based on the mass of the feedstock. This feedstock is suitably tall oil.

Hydroprocessing is performed using one or more catalysts. Effective catalysts comprise one or more metals selected from Group VIA and Group VIII metals, particularly useful examples of which are Mo, W, Co, Ni, Pt and Pd. The catalyst(s) can also contain one or more support materials, examples of which are zeolite, alumina ($Al_2O_3$), zeolite-alumina, alumina-silica ($SiO_2$), alumina-silica-zeolite and activated carbon.

The method suitably utilises a hydrodeoxygenation (HDO) catalyst, which is intended for removal of oxygen but is also capable of removing other heteroatoms such as sulfur and nitrogen from organic compounds as well as catalysing hydrogenation of unsaturated bonds. Effective HDO catalysts include those containing a mixture of CoO and $MoO_3$ ("CoMo") and/or a mixture of NiO and $MoO_3$ ("NiMo"), and one or more support materials selected zeolite, alumina, zeolite-alumina, alumina-silica, alumina-silica-zeolite and activated carbon. A mixture of NiO and $MoO_3$ on an alumina support is particularly effective.

Another effective hydroprocessing catalyst is a multifunctional catalyst. This type of catalyst is capable of catalysing the same reactions as HDO catalysts. In addition, multifunctional catalysts can effect isomerisation (e.g. conversion of linear alkanes to branched alkanes) and cracking, which decreases the hydrocarbon chain length. Both isomerisation and cracking can improve cold flow properties.

Useful multifunctional catalysts include those containing NiW and one or more support materials selected from zeolite, alumina, zeolite-alumina, alumina-silica, alumina-silica-zeolite and activated carbon. An alumina support with adequate acidic properties is preferred. The acidity can be adjusted by adding zeolites to the support. For example, the support comprises zeolite-alumina or alumina-silica-zeolite.

A further suitable hydroprocessing catalyst is a hydroisomerisation (HI) catalyst. HI catalysts are capable of causing isomerisation reactions. Example catalysts contain a Group VIII metal (e.g. Pt, Pd, Ni) and/or a molecular sieve. Preferred molecular sieves are zeolites (e.g. ZSM-22 and ZSM-23) and silicoaluminophosphates (e.g. SAPO-11 and SAPO-41). HI catalysts may also contain one or more of the support materials described above. In one embodiment, the HI catalyst comprises Pt, a zeolite and/or silicoaluminophosphate molecular sieve, and alumina. The support may alternatively or additionally contain silica.

According to a preferred embodiment, the hydroprocessing step is performed using one or both of the following catalysts (i) and (ii), and optionally the following catalyst (iii):
(i) a catalyst comprising $MoO_3$, one or both of CoO and NiO, and one or more support materials;
(ii) a catalyst comprising NiW and one or more support materials;
(iii) a catalyst comprising a Group VIII metal and/or a molecular sieve;
wherein the support materials are selected from zeolite, alumina, zeolite-alumina, alumina-silica, alumina-silica-zeolite and activated carbon.

Suitable catalyst combinations are (i) and (ii), (i) and (iii), (ii) and (iii), and (i), (ii) and (iii). It is, however, also possible for the hydroprocessing step to be carried out using catalyst (i) alone or catalyst (ii) alone.

It is preferable to remove sulfur compounds from the feedstock before it is reacted with catalyst (iii) in the case that catalyst (iii) contains a Group VIII metal (e.g. Pt). This prevents poisoning of catalyst (iii) by sulfur compounds. Preferably, the feedstock is contacted with catalyst (i) prior to catalyst (iii).

Hydroprocessing is performed using one reactor or using two or more reactors (i.e. separate pressure vessels). In the case that a plurality of hydroprocessing reactors are employed, the reactors can be connected in series so that the product of one reactor is fed to another reactor. Each reactor can contain a single "bed" comprising one or more catalysts and optionally other materials such as an inert material (e.g. for temperature control). Alternatively, any given reactor may contain a plurality of catalyst beds which each contain one or more catalysts and optionally other materials such as an inert material. Examples of the inert material include alumina, silicon carbide and glass beads. Reactors containing more than one catalyst bed can comprise a quench gas inlet and a distributor between any two catalyst beds.

Catalyst beds can be monolayered (e.g. contain one catalyst or a mixture of catalysts) or comprise a plurality of layers containing different proportions of two or more catalysts. The layers can vary in size.

Inert material-containing layers can be used to separate catalyst beds. Moreover, an inert layer may be inserted before the first catalyst bed and/or after the final catalyst bed. Inert layers can be used to capture certain substances and provide an even distribution of the feedstock/reaction mixture. An inert layer located upstream of the first catalyst bed may also be used to preheat the feedstock.

Inert layers can also contain active catalyst material having the function of removing harmful components (e.g. metals) from the feedstock/reaction mixture.

Hydroprocessing can be performed using a reactor containing a single catalyst such as catalyst (i). This catalyst can be contained in a single bed or in multiple beds in the reactor.

In a more preferred embodiment, hydroprocessing is performed using one or more reactors which each contain catalyst (i) and one or both of catalysts (ii) and (iii). In this case, catalyst (i) and catalyst (ii) and/or (iii) may be contained in the same bed (e.g. in a reactor having a single catalyst bed), separate beds or a mixture thereof in any given reactor. Preferably, at least one reactor contains catalyst (i) as well as catalyst (ii) and/or catalyst (iii), and the total amount of catalyst (ii) and/or catalyst (iii) relative to the total amount of catalysts (i), (ii) and (iii) increases continuously in the direction of flow of the biological feedstock in the reactor. This may occur over a single catalyst bed containing all of the catalysts (in layered or mixed form) or over a plurality of catalyst beds (e.g. two beds) which each contain one or all of the catalysts. The exact proportions of the catalysts can be varied according to the nature of the feedstock. Increased amounts of catalysts (ii) and (iii) can be used to increase the levels of cracking and isomerisation.

In one particular example, a hydroprocessing reactor contains two or three catalyst beds and the proportion of catalyst (ii) and/or (iii) increases on moving between the catalyst beds in the flow direction. The first bed contains only catalyst (i) or a mixture of catalysts (i) and (ii) in a particular mass ratio (e.g. 70-99:1-30), the second bed contains a mixture of catalyst (i) and one or both of catalysts (ii) and (iii) in a lower mass ratio (e.g. 30-70:30-70 (total of (ii) and (iii)), and the third bed (when present) contains a mixture of catalyst (i) and one or both of catalysts (ii) and (iii) in a still lower mass ratio (e.g. 2-15:85-98) or contains only catalyst (ii) and/or catalyst (iii).

In another embodiment, a reactor contains two catalyst beds only, the first bed (closest to the feedstock inlet) containing catalyst (i) and no catalyst (ii) or catalyst (iii), and the second bed containing catalyst (ii) and/or catalyst (iii) but no catalyst (i).

In an alternative preferred embodiment, the relative amounts of the catalysts vary across two or more interconnected reactors. For instance, a first reactor contains a catalyst bed comprising only catalyst (i) or a mixture of catalysts (i) and (ii) in a particular mass ratio (e.g. 70-95: 5-30), and a second reactor connected downstream of the first reactor contains a catalyst bed comprising a mixture of catalyst (i) and one or both of catalysts (ii) and (iii) in a lower mass ratio (e.g. 1-15:85-99 (total of (ii) and (iii)) or comprising only catalyst (ii) and/or catalyst (iii).

It is preferred that hydroprocessing reactors are connected such that no components of the reaction mixture exiting a first reactor (e.g. a reactor containing catalyst (i)) are removed before passing the mixture to the next reactor (e.g. a reactor containing catalyst (ii)). In this way, there is a single, closed hydroprocessing system (other than the reactor inlets and outlets) divided across more than one reactor. Similarly, it is preferred that the product having passed through one or more guard beds (see below) passes to the hydroprocessing bed(s) without the removal of by-products or other components. In general, all catalyst beds are preferably connected in this manner.

FIG. 1 illustrates a hydroprocessing reactor suitable for use in the manufacturing method of the present invention. The hydroprocessing reactor 1 contains three catalyst beds (beds 2, 2' and 2"), which are optionally separated by quench gas distributors. Catalyst bed 2 is located closest to the biological feedstock inlet, and catalyst bed 2" is located closest to the outlet, which is connected to line 5. At least bed 2 contains catalyst (i) described above (e.g. NiMo/Al$_2$O$_3$), at least bed 2" contains catalyst (ii) described above (e.g. NiW/zeolite/Al$_2$O$_3$), and at least one bed contains catalyst (i) in combination with catalyst (ii). For instance, beds 2 and 2' contain catalysts (i) and (ii), the proportion of catalyst (ii) in bed 2' being higher than that in bed 2. Suitable content ratios are 70-99 (catalyst (i)):1-30 mass % (catalyst (ii)) and 30-70:30-70 mass % for beds 2 and 2' respectively. The proportion of catalyst (ii) in bed 2" is higher still (e.g. 85-100 mass %), preferably 100 mass %.

Line 3 supplies the feedstock to the reactor 1, whilst line 4 supplies pure hydrogen or a hydrogen-containing gas to the reactor 1. The hydrogen line 4 connects to the feed line 3 shortly before the feed line enters the reactor 1, thereby allowing pre-mixing of the feedstock and hydrogen. In an alternative embodiment, lines 3 and 4 are connected separately to the reactor 1.

The hydrogen supply line 4 optionally splits to form one or more branch lines which are connected to the reactor 1 downstream of the feedstock inlet. In FIG. 1, optional quench gas lines are connected between the catalyst beds to allow for control of the hydrogen content of the catalyst beds and control of the reactor temperature.

HDO and multifunctional catalysts (catalysts (i) and (ii)) may benefit from the addition of sulfur before the feedstock is introduced into the reactor. A suitable sulfiding agent is dimethyl disulfide. On the other hand, the performance of an HI catalyst (catalyst (iii)) may be enhanced by preventing sulfur coming into contact with the catalyst. Accordingly, as mentioned above, if a hydroprocessing reactor contains an HI catalyst, means for preventing sulfur from contacting the HI catalyst are preferably provided. Sulfur can be removed from the reactor downstream of an HDO/multifunctional catalyst but upstream of an HI catalyst.

A suitable reactor temperature during hydroprocessing is 280-450° C., preferably 350-420° C. and most preferably 350-390° C. A suitable reactor pressure is 10-250 bar, preferably 30-130 bar and most preferably 80-110 bar.

The products of hydroprocessing are influenced by the feed rate of the feedstock. The weight hourly spatial velocity (WHSV) of the feedstock can be 0.1-5.0 h$^{-1}$, preferably 0.2-0.8 h$^{-1}$ and most preferably 0.3-0.7 h$^{-1}$. WHSV is defined as follows:

$$\text{WHSV} = V/m$$

wherein "V" is the feed velocity of the feedstock (g/h) and "m" is the mass of the catalyst (g).

The ratio of the amount of hydrogen supplied to the hydroprocessing reactor(s) to the amount of the feedstock supplied to the reactor(s) also has a bearing on the reaction. It is preferred that this ratio is 600-4000 Nl/l (Nl=normal liter), more preferably 1300-2200 Nl/l.

The amount of monoaromatic hydrocarbons can be controlled by appropriate selection of hydroprocessing conditions. For instance, the amount of monaromatics can be increased by increasing the hydroprocessing reactor temperature. Lowering the reactor pressure also causes an increase in the monoaromatics content.

The process of the invention can include additional steps before and/or after the hydroprocessing step. Such optional steps include purification of the feedstock and purification of the product of hydroprocessing prior to fractionation.

The feedstock may be purified by evaporation. This may be accomplished in one or more stages. In the case that two or more evaporators are employed, the temperature is typically increased successively from the first to the second and subsequent evaporators. In one embodiment, the feedstock is heated to 110-230° C. at a pressure of 40-80 mbar in order to remove light compounds such as water and short chain hydrocarbons. In another embodiment, two evaporators are employed, the first evaporator (e.g. a thin-film evaporator) operating at 150-230° C. and 40-80 mbar, and the second evaporator operating at 300-390° C. and 0.01-15 mbar. In a further embodiment, three evaporators are employed, the first evaporator operating at 150-230° C. and 40-80 mbar, the second evaporator operating at 200-280° C. and approximately 2-3 mbar, and the third evaporator operating at 250-360° C. and approximately 0.3 mbar. These embodiments are particularly suited to the purification of crude tall oil. The residue of the first evaporator is fed to the second evaporator, and the distillate of the second evaporator is fed to the third evaporator. The use of an initial evaporation step enables boiling in the subsequent step to be performed in a controlled manner since low boiling compounds are removed in the first step.

Prior to hydroprocessing, the feedstock may be passed through one or more guard units together with hydrogen in order to remove hazardous substances such as metal residues, thereby protecting the hydroprocessing catalysts from poisoning and fouling. For this, the guard units can comprise an HDO and/or multifunctional catalyst arranged in one or more beds. These catalysts are as described above for the hydroprocessing step, the difference being that the catalysts used in the guard unit(s) typically have a lower activity; for instance, a NiMo catalyst used in a guard unit has a relatively low hydrogenation activity.

Guard units are typically separated from the hydroprocessing reactor(s). However, it is possible to include one or more guard beds upstream of the hydroprocessing catalyst bed(s) in the same unit (pressure vessel).

The hydroprocessed composition can be cooled and light gaseous compounds such as water, hydrogen, hydrogen sulfide, carbon monoxide and carbon dioxide removed from the composition. The removed gases can be passed through an amine scrubber in order to separate hydrogen sulfide and carbon dioxide from the remaining gases. Hydrogen can be separated and reused as a quench gas in the hydroprocessing reactor.

The composition of the invention is isolated by fractionation of the hydroprocessed composition, preferably following the removal of gases as described above. Fractionation separates the composition of the invention from relatively heavy hydrocarbons such as those in the diesel fuel range. The fractionation step typically makes use of the distillation properties discussed above. The composition can be distilled over the temperature range of 30-210° C., preferably 40-200° C.

The composition of the invention can be used as a pure biofuel or as a renewable component of a fuel. The composition is most notably suitable for use as a petroleum naphtha substitute. The composition can be blended with a petroleum-derived fuel such as petroleum naphtha or petroleum gasoline in order to reduce the proportion of non-renewable components. The composition may additionally or alternatively be blended with ethanol, which may be bioethanol (i.e. produced from renewable source). Other compounds which may be included in a fuel blend together with the composition of the invention include oxygen-containing compounds such as higher ($C_{3-8}$) alcohols (e.g. isobutanol) and ethers (e.g. ethyl tert-butyl ether). A fuel blend may also contain additional hydrocarbons such as butane.

A fuel blend can contain the composition of the invention in various amounts depending upon the desired properties of the blend and the identity of the other components of the blend. For instance, a fuel blend may contain the composition in an amount of 2-85 vol. %, preferably 3-25 vol. %. Ethanol may be contained in the fuel blend in an amount up to 85 vol. %, preferably 60-85 vol. %, more preferably 70-85 vol. % and most preferably 75-85 vol. %. The fuel blend may also contain up to 2 vol. % of higher ($C_{3-8}$) alcohols.

In one embodiment, a fuel blend comprises 2-25 vol. % of the composition of the invention, 75-85 vol. % of ethanol, 1-5 vol. % of ether compounds comprising five or more carbon atoms (e.g. ethyl tert-butyl ether) and up to 2 vol. % of higher ($C_3$-$C_8$) alcohols (e.g. isobutanol), the total amount of butane contained in the fuel blend being 2-10 vol. %. The blend may additionally contain 0.5-2 vol. % of methanol, and the blend may contain petroleum gasoline and/or petroleum naphtha, preferably in a minor amount.

In another embodiment, a fuel blend comprises 2-25 vol. % of the composition of the invention, and 75-86 vol. % in total of ethanol and higher ($C_{3-8}$) alcohols, the amount of higher alcohols being up to 2 vol. %, and the total amount of butane contained in the blend being 2-10 vol. %. The blend may additionally contain one or more of petroleum gasoline, petroleum naphtha, 0.5-2 vol. % of methanol, and ether compounds comprising five or more carbon atoms, preferably in minor amounts. Additional butane may not be needed if the composition of the invention contains a sufficient amount of butane.

EXAMPLES

Example 1

A hydrocarbon composition was produced by subjecting crude tall oil to a hydroprocessing treatment. The crude tall oil originated from tall oil soap obtained from chemical digestion of a mixture of northern soft wood (pine and spruce) and birch. The crude tall oil contained 51 mass % of fatty acids, 26 mass % of resin acids and 23 mass % of neutral compounds.

The crude tall oil was purified by a three-step evaporation process to remove 4% of the oil as a light fraction and 6% of the oil as a heavy pitch fraction. The purified oil was fed into a pilot reactor system together with hydrogen. The pilot reactor system contained a guard unit having two catalyst layers arranged in series. The catalyst layers each contained Ni, Mo and W as active metals and $SiO_2$ and $Al_2O_3$ as support materials and metal scavengers.

From the guard unit, the composition was passed to a hydroprocessing reactor together with hydrogen. The hydroprocessing reactor comprised four monolayered catalyst beds through which the reaction mixture was passed in a series-wise manner. The compositions of the catalyst beds are detailed in Table 1 below. Hydrogen was also introduced between the catalyst layers.

TABLE 1

| Catalyst bed no. | NiW/zeolite/$Al_2O_3$ (mass %) | NiMo/$Al_2O_3$ (mass %) |
| --- | --- | --- |
| 1 | 20 | 80 |
| 2 | 90 | 10 |
| 3 | 95 | 5 |
| 4 | 100 | 0 |

The hydroprocessing conditions are detailed in Table 2 below.

TABLE 2

| | |
| --- | --- |
| WHSV | 0.60 |
| $H_2$/CTO feed rate (Nl/l) | 1480 |
| Pressure (bar) | 90 |
| Temperature (° C.) | 365 |

The hydroprocessed composition was passed to a separator for the removal of water and light gases. The composition was then passed to a fractionator, where a fraction distilling in the temperature range of 80-190° C. was collected. Table 3 below details the amounts of the various components of the distillate, as determined by gas chromatography. (ASTM D6729, 100 meter capillary high resolution gas chromatography).

TABLE 3

| Component | Content (mass %) |
|---|---|
| $C_{4-12}$ linear alkanes | 15.9 |
| $C_{5-9}$ linear alkanes | 15.9 |
| $C_{6-9}$ linear alkanes | 15.6 |
| $C_{4-12}$ branched alkanes | 34.3 |
| $C_{5-11}$ branched alkanes | 34.3 |
| $C_{6-10}$ branched alkanes | 33.5 |
| $C_{5-12}$ cycloalkanes | 41.2 |
| $C_{6-10}$ cycloalkanes | 40.9 |
| $C_{6-9}$ cycloalkanes | 39.7 |
| $C_{6-12}$ aromatic hydrocarbons | 6.1 |
| $C_{6-10}$ aromatic hydrocarbons | 5.9 |
| $C_{7-10}$ aromatic hydrocarbons | 5.5 |
| $C_{4-12}$ linear alkanes + $C_{4-12}$ branched alkanes | 50.2 |
| $C_{4-12}$ linear alkanes + $C_{4-12}$ branched alkanes + $C_{5-12}$ cycloalkanes + $C_{6-12}$ aromatic hydrocarbons | 97.5 |
| Alkenes | 0.2 |
| Oxygenates | <0.1 |

The density of the composition was 740 kg/m³ when measured at 15° C. using the method of EN ISO 3675.

The initial boiling point of the composition was 84.6° C., 10 vol. % of the composition was distilled at temperatures up to 98.4° C., 50 vol. % of the composition was distilled at temperatures up to 115.9° C., 90 vol. % of the composition was distilled at temperatures up to 146.2° C., and the cut-off temperature (final boiling point) was 185.7° C.

The invention claimed is:

1. A composition comprising 8-30 mass % of $C_{4-12}$ linear alkanes, 20-50 mass % of $C_{4-12}$ branched alkanes, 25-60 mass % of $C_{5-12}$ cycloalkanes, 1-25 mass of $C_{6-12}$ aromatic hydrocarbons, no more than 1 mass % of alkenes, and no more than 0.5 mass % in total of oxygen-containing compounds;
   wherein the total amount of $C_{4-12}$ alkanes is 40-70 mass %, and the total amount of $C_{4-12}$ alkanes, $C_{5-12}$ cycloalkanes and $C_{6-12}$ aromatic hydrocarbons is at least 95 mass %; and
   wherein the amounts are based on the mass of the composition.

2. A composition according to claim 1, wherein the amount of $C_{4-12}$ linear alkanes is 10-20 mass %.

3. A composition according to claim 1, wherein the amount of $C_{4-12}$ branched alkanes is 20-40 mass %.

4. A composition according to claim 1, wherein the amount of $C_{5-12}$ cycloalkanes is 30-50 mass %.

5. A composition according to claim 1, wherein the amount of $C_{6-12}$ aromatic hydrocarbons is 2-15 mass %.

6. A composition according to claim 1, wherein the linear alkanes are $C_{5-10}$ linear alkanes.

7. A composition according to claim 1, wherein the branched alkanes are $C_{5-11}$ branched alkanes.

8. A composition according to claim 1, wherein the cycloalkanes are $C_{6-10}$ cycloalkanes.

9. A composition according to claim 1, wherein the aromatic hydrocarbons are $C_{6-10}$ aromatic hydrocarbons.

10. A fuel blend comprising a composition as defined in claim 1.

11. A fuel blend according to claim 10, wherein the amount of the composition is 2-85 vol. % based on the volume of the fuel blend.

12. A fuel blend according to claim 11, wherein the amount of the composition is 5-25 vol. %.

13. A fuel blend according to claim 11, which further comprises a petroleum-derived fuel.

14. A fuel blend according to claim 13, wherein the petroleum-derived fuel is petroleum naphtha and/or petroleum gasoline.

15. A fuel blend according to claim 10, which further comprises ethanol.

16. A fuel blend according to claim 15, wherein the amount of ethanol is up to 85 vol. % based on the volume of the fuel blend.

17. A fuel blend according to claim 16, wherein the amount of ethanol is 75-85 vol %.

18. A fuel blend according to claim 10, which further comprises at least one of butane, isobutanol and ethyl tert-butyl ether.

19. A fuel blend according to claim 10, which comprises 2-25 vol. % of the composition, 75-85 vol. % of ethanol, 1-5 vol. % of ether compounds containing five or more carbon atoms, and up to 2 vol. % of $C_{3-8}$ higher alcohols, the amount of butane contained in the fuel blend being 2-10 vol. %.

20. The composition according to claim 1, wherein the density of the composition is 720-775 kg/m³ as measured at 15° C. by EN ISO 12185 method.

21. The composition according to claim 1, wherein the composition begins to distill at 30° C. and finishes distilling at 210° C. as measured using EN ISO 3405 method.

* * * * *